US009546881B2

(12) United States Patent
Chang et al.

(10) Patent No.: US 9,546,881 B2
(45) Date of Patent: Jan. 17, 2017

(54) SERVER, USER TERMINAL, AND SERVICE PROVIDING METHOD, AND CONTROL METHOD THEREOF

(71) Applicant: Samsung Electronics Co., Ltd., Gyeonggi-do (KR)

(72) Inventors: Woo-Yong Chang, Gyeonggi-do (KR); Seung-dong Yu, Gyeonggi-do (KR); Se-jun Park, Gyeonggi-do (KR); Min-jeong Moon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/755,588

(22) Filed: Jun. 30, 2015

(65) Prior Publication Data

US 2015/0300838 A1    Oct. 22, 2015

Related U.S. Application Data

(63) Continuation of application No. 12/943,711, filed on Nov. 10, 2010, now Pat. No. 9,080,893.

(30) Foreign Application Priority Data

Nov. 13, 2009    (KR) .................... 10-2009-0109512

(51) Int. Cl.
G01C 21/36    (2006.01)

(52) U.S. Cl.
CPC ....... *G01C 21/3647* (2013.01); *G01C 21/3602* (2013.01); *G01C 21/3623* (2013.01)

(58) Field of Classification Search
CPC combination set(s) only.
See application file for complete search history.

(56) References Cited

U.S. PATENT DOCUMENTS

| 6,182,010 B1 | 1/2001 | Berstis |
| 2008/0304706 A1 | 12/2008 | Akisada et al. |
| 2008/0312824 A1 | 12/2008 | Jung |
| 2009/0136226 A1 | 5/2009 | Wu et al. |
| 2010/0149399 A1 | 6/2010 | Mukai et al. |

FOREIGN PATENT DOCUMENTS

| JP | 11-250273 | 9/1999 |
| JP | 2008-306604 | 12/2008 |
| JP | 2009-017540 | 1/2009 |
| KR | 1020070109580 | 11/2007 |
| KR | 1020090070048 | 7/2009 |

*Primary Examiner* — Thomas Tarcza
*Assistant Examiner* — Edward J Pipala
(74) *Attorney, Agent, or Firm* — The Farrell Law Firm, P.C.

(57) ABSTRACT

A control method of a server is provided. Location information is extracted from photographed data. The photographed data is linked to a course of travel having a pre-stored street image, by applying a predetermined standard based on the extracted location information. The photographed data is provided together with the linked course of travel having the pre-stored street image.

8 Claims, 17 Drawing Sheets

SERVER, USER TERMINAL, AND SERVICE PROVIDING METHOD, AND CONTROL METHOD THEREOF

PRIORITY

This application is a Continuation Application of U.S. patent application Ser. No. 12/943,711, filed in the U.S. Patent and Trademark Office on Nov. 10, 2010 and claims priority under 35 U.S.C. §119(a) to Korean Patent Application No. 10-2009-0109512, filed on Nov. 13, 2009, in the Korean Intellectual Property Office, the disclosure of which is incorporated herein by reference.

BACKGROUND OF THE INVENTION

1. Field of the invention

The present invention relates generally to a server, a user terminal and a service providing method, and more particularly, to a server that provides a street image, a user terminal and a service providing method, and a control method thereof.

2. Description of the Related Art

Location Based Services (LBSs) and Geographical Information Systems (GISs) have been rapidly developed in association with Global Positioning System (GPS) techniques.

Such rapid development has enabled people to utilize information relating to where a specific object is placed, where they are, or where to head to, almost anytime and anywhere. A digital camera has been recently made available, which utilizes a technique to receive a GPS signal and geographically tag ('geotag') location information to a photograph taken by the digital camera.

SUMMARY OF THE INVENTION

The present invention has been made to address at least the above problems and/or disadvantages and to provide at least the advantages described below. Accordingly, an aspect of the present invention provides a server that enables a user to experience an environment of a photographing location, using photographed data and corresponding location information thereof, a user terminal and a service providing method, and a control method thereof.

According to one embodiment of the present invention, a method for providing a service is provided. Corresponding location information is extracted from photographed data. The photographed data is linked to a course of travel having at least one pre-stored street image, by applying a predetermined standard based on the extracted location information. The photographed data is provided together with the course of travel having the at least one pre-stored street image.

The method may additionally include generating a map image along the linked course of travel, generating an icon moveable along the course of travel on the generated map image, matching a corresponding real-life street image to the spot on which the icon is placed, and if the icon is placed on the spot corresponding to the location information, providing the photographed data.

According to another embodiment of the present invention, a method is provided for controlling a user terminal that displays photographed data. Information about a course of travel and at least one street image is received from a server. Photographed data is displayed together with the at least one street image along the course of travel based on the photographed data. The course of travel is linked to the photographed data according to a predetermined standard based on extracted location information of the photographed data.

According to an additional embodiment of the present invention, a server is provided. The server includes an extracting unit that extracts location information from photographed data, and a storage unit that stores at least one street image and information about a course of travel corresponding to the at least one street image. The server also includes a control unit that links the photographed data to the course of travel having the at least one stored street image, by applying a predetermined standard based on the extracted location information, and a communicating unit that provides the photographed data together with the course of travel having the at least one pre-stored street image.

The server may generate a map image along the linked course of travel, generate an icon moveable along the course of travel on the generated map image, match a corresponding real-life street image to the spot on which the icon is placed, and if the icon is placed on the spot corresponding to the location information, provide the photographed data.

According to a further embodiment of the present invention, a user terminal is provided. The user terminal includes a communicating unit that receives information about a course of travel and at least one street image from a server, and a display unit that displays photographed data. The user terminal also includes a control unit that causes the photographed data to be displayed together with the at least one street image along the course of travel based on the photographed data. The course of travel is linked to the photographed according to a predetermined standard based on extracted location information of the photographed data.

According to another embodiment of the present invention, a user terminal is provided. The user terminal includes a photographing unit that generates photographed data by photographing, a location receiving unit that receives location information during photographing by the photographing unit, and a communicating unit that communicates with an external display apparatus. The user terminal also includes a control unit that determines information on a course of travel based on the location information received during photographing by the photographing unit and location information of at least one street image, and provides control so that the determined information on the course of travel and the photographed data are transmitted to the external display apparatus via the communicating unit.

The user terminal may additionally include a storage unit. The control unit periodically checks the received location information to update the information on the course of travel and store the updated information in the storage unit.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
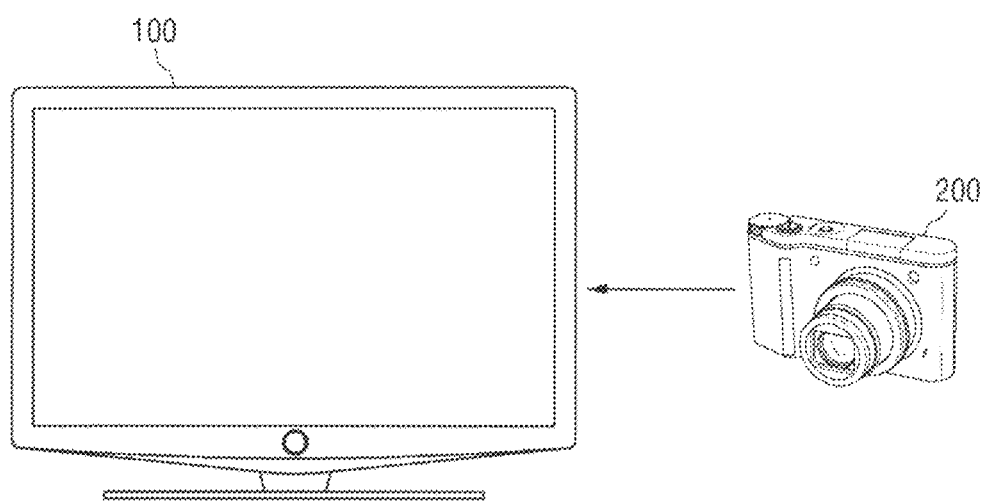
FIG. 1 is a diagram illustrating a display service, according to an embodiment of the present invention.

Embodiments of the present invention are described in detail with reference to the accompanying drawings.

In the following description, the same or similar reference numerals may be used for the same or similar elements when they are illustrated in different drawings. Detailed descriptions of constructions or processes known in the art may be omitted to avoid obscuring the subject matter of the present invention.

FIG. 1 is a diagram illustrating a display service, according to an embodiment of the present invention.

Referring to FIG. 1, a display system includes a display apparatus 100 and a user terminal 200.

The display apparatus 100 may be implemented as a television (TV), but is not limited thereto. Accordingly, the display apparatus 100 may alternatively be implemented as any apparatus employing a display function, such as an electronic frame, a Personal Computer (PC), a laptop computer, or a Personal Digital Assistant (PDA).

The user terminal 200 refers to an apparatus with photographing function, and may representatively be implemented as a digital camera, but is not strictly limited thereto. For example, any apparatus that has the photographing function and that is portable by a user, such as a mobile phone or a camcorder, may also be implemented as the user terminal 200.

The user terminal 200 may additionally include a built-in GPS to store location information in the photographed data during photographing.

Specifically, the user terminal 200 may receive a GPS signal from a GPS satellite and generate location information.

More specifically, the user terminal 200 may measure a time and a distance for the signal from at least three GPS satellites to reach the user terminal 200, to thereby measure the current location. Additionally, the user terminal 200 may use a Differential GPS (DGPS) to minimize an error range.

The user terminal 200 may acquire from the GPS signal not only the location information including latitude, longitude, and altitude information, but also three-dimensional velocity information and precise time information.

The user terminal 200 may store a location value in every photograph through an external device such as GPS log, in response to clicking on a GPS log button, and may geotag the location information at a later stage to the photographed data by linking the corresponding location value through an appropriate program.

The user can view the photographed images taken through the user terminal 200 on the screen of the display apparatus 100, together with the image of the place (e.g., a street) where the images are taken. In such a situation, the display apparatus 100 and the user terminal 200 may be linked to each other wirelessly via a wireless network such as Wi-Fi, Wipi, Bluetooth, Ultra Wide (UW) and system, or alternatively, may be linked to each other via a wired network such as Universal Serial Bus (USB), IEEE1394, or Ethernet.

If the user connects the display apparatus 100 to the user terminal 200, a street image is provided according to a course of travel based on the location information tagged in the photographed data. The photographed data may be displayed overlappingly on the displayed street image. The above operation may be executed instantly upon receipt of the photographed data, or in response to input of a user command. As the user watches the photographs on the street image, it feels as if he/she is moving along the same street that the photographs were taken on, thereby providing a more vivid memory.

Specifically, the display apparatus 100 may receive photographed data and location information corresponding to the photographed data from the user terminal 200 with photographing function. The display apparatus determines a course of travel of the photographing apparatus based on the received location information and predefined location information of a street image. According to the determined course of travel, the display apparatus 100 may display the corresponding photographed data. In such a situation, the user may receive information about the course of travel from the user terminal 200. Alternatively, the display apparatus 100 may estimate the course of travel of the photographing apparatus using the location information included in the photographed data.

More specifically, the display apparatus 100 may display a real-life street image corresponding to respective spots on the determined course of travel. The display apparatus 100 may present the photographed data together with the street view by displaying the corresponding photographed data at the time of displaying the street image corresponding to the location information on the course of travel.

The display apparatus 100 may display a map image according to the determined course of travel. The display apparatus 100 may move an icon along the course of travel on the map image and display a real-life street image corresponding to the spot on which the icon is placed. The display apparatus 100 may display corresponding photographed data if the icon is on a spot that corresponds to the location information of the photographed data.

Furthermore, if the icon is placed on a spot that corresponds to the location information of the photographed data on the map image, and if the real-life street image is available for the spot, the display apparatus 100 may display the real-life street image and the photographed data together.

The map information, map image or real-life street images, necessary for the estimation of course of travel, may be provided through a web server. The display apparatus 100 or the user terminal 200, whichever generates the course of travel, may be implemented to receive corresponding data.

Figure 2A:
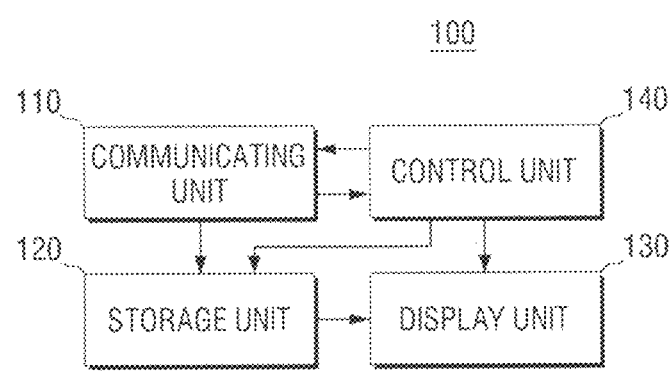
FIGS. 2A and 2B are block diagrams illustrating a display apparatus that provides the display service, according to an embodiment of the present invention.
Figure 2B:
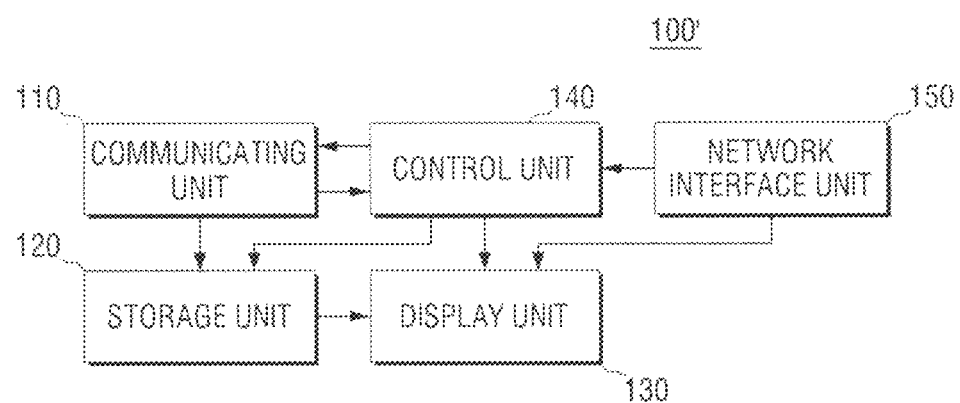

FIGS. 2A and 2B are block diagram illustrating the display apparatus 100 constructed to provide the display service, according to an embodiment of the present invention.

Referring to FIG. 2A, the display apparatus 100 includes a communicating unit 110, a display unit 120, a display 130, and a control unit 140.

The communicating unit 110 may perform communication with the user terminal 100 wirelessly or by wire. The communicating unit 110 may be implemented as a wireless network interface such as Wi-Fi, wipi, Bluetooth, or UW and system, and depending on the case, may also be implemented as a wired network interface such as USB, IEEE1394, or Ethernet.

The communicating unit 110 may receive photographed data taken at the user terminal 100. The photographed data may include the information about the location and time that the photographs were taken.

Additionally, the communicating unit 110 may receive a code from the user terminal 100 to construct a Remote User Interface (RUI) screen. The RUI may be implemented as a screen that is required to display the photographed data on the display unit 130.

The communicating unit 110 may also receive a code from the web server to obtain Application Programming Interface (API) that is required to construct a screen to display a street view. The code required to receive the API may alternatively be previously stored in the display apparatus 100. Accordingly, using a corresponding code, the display apparatus 100 may download the API from the web server, which provides street images.

The storage unit 120 may provide a storage space to store software such as an Operational System (OS) that is necessary for the operation of the display apparatus 100.

The storage unit 120 may also store the photographed data received from the user terminal 100.

The storage unit 120 may additionally store at least one of the information about a course of travel received from the user terminal 100 and the information about a course of travel generated at the display apparatus 100.

The display apparatus 130 may display the photographed data received from the user terminal 100. Additionally, the display apparatus 130 may operate to display the street image corresponding to the course that is estimated based on the location information included in the photographed data.

The display apparatus 100 may receive the map information and street image from the user terminal 200 to estimate the course of travel. Depending on the case, the display apparatus 100 may receive from the user terminal 200 the map information and the corresponding street image including the previously-estimated course of travel. The street image may be the real-life image of the corresponding street, and depending on cases, the street image may be provided as a graphic image or 3D picture. The street image may also be provided so that the street image can be rotated 360 degrees. Furthermore, people's faces or car number plates may be blurred in the street image.

In another example of the present invention, the display apparatus 100 may store the map information and street image to estimate the course of travel in advance.

The display unit 130 may include a Liquid Crystal Display (LCD), a Plasma Display Panel (PDP), or the like.

The control unit 140 may control the overall operations of the respective elements of the display apparatus 100.

In particular, the control unit 140 controls the display unit 130 to process and display the photographed data received through the communicating unit 110 on the screen. A user command may be inputted through a remote controller or the user terminal 200.

The control unit 140 determines the course of travel of the photographing apparatus based on the location information of the received photographed data and the location information of the pre-defined street image. The control unit 140 provides control so that the real-life street image corresponding to the respective spots on the determined course of travel can be displayed. If the location information of the street image and the location information of the photographed data meet a predetermined standard, the control unit 140 may also provide control so that the photographed data can be displayed together with the street image.

Additionally, the control unit 140 may estimate possible courses of travel based on the location information of the received photographed data, and determine the course of travel of the photographing apparatus based on the course of travel that provides the pre-defined street image, among the estimated courses of travel.

Additionally, the control unit 140 determines if there is a street image from among the previously stored street images on the course of travel between respective intersections that matches the location information of the photographed data. If there is not a street image, the control unit 140 may determine a course of travel based on the location information of the photographed data.

Specifically, the control unit 140 may determine whether or not the street image matches the predetermined standard based on whether or not the location information of the street image and the location information of the photographed data are within a predetermined distance range. In order to determine if the respective location information is within a preset distance range, the control unit 140 may divide the determined course of travel into linear parts and determine if the respective location information is within a preset distance perpendicular to the respective linear parts.

Additionally, the control unit 140 may provide control so that, if there is no photographed data that corresponds to the location information of the street image and the predetermined standard, the street image can be displayed in an altered state or together with the related information.

Additionally, if the location information of the temporally-continuous photographed data corresponds to the location information of a street different from the street whose street image is currently provided, the control unit 140 may provide control so that the street image can be displayed in an altered state (e.g., in black and white, in reduction, or canceled). The control unit 140 may also provide control so that the information of the street whose street image is provided, or the street information matching the location information of the photographed data can be displayed.

Additionally, if there is no photographed data that corresponds to the displayed street image, the control unit 140 may cause the photographed data, which is located (photographed) temporally between at least two pieces of photographed data and that matches the pre-defined street image, to be displayed.

The control unit 140 may control the display unit 130 to display the corresponding photographed data along the determined course of travel.

Specifically, the control unit 140 may control the display unit 130 to display the real-life street images corresponding to the respective spots on the determined course of travel, and display the photographed data together when displaying the street image of the spot that corresponds to the location information of the photographed data on the course of travel.

The control unit 140 may determine that the photographed data matches the course of travel, if the location information of the course of travel is within a preset distance range to the location information of the photographed data.

If there is a plurality of photographed data in which the location information of the course of travel and the location information of the photographed data are within the preset distance range, the control unit 140 may provide control so that the photographed data with the least error can be displayed. Alternatively, the control unit 140 may provide control so that the plurality of photographed data in which the location information of the course of travel and the location information of the photographed data are within the preset distance range, can be displayed at once.

If the location information of the temporally-continuous photographed data corresponds to the location of a street different from the street whose street image is currently provided, the control unit 140 may cause the street image to be displayed in an altered state (e.g., in black and white, in reduction, or canceled). Additionally, the control unit 140 may cause the information of the street whose street image is provided, or the information about the street that matches the location of the photographed data, to be displayed together.

The control unit 140 may control the display unit 130 to display a map image according to the determined course of travel in which case the display unit 130 may move an icon along the course of travel on the map image and display real-life street image corresponding to the spot where the icon is on. The control unit 140 may control the display unit 130 to display corresponding photographed data if the icon is on a spot that corresponds to the location information of the photographed data.

Furthermore, if the icon is placed on a spot which corresponds to the location information of the photographed data on the map image and if the real-life street image is available for the spot, the control unit 140 may control the display unit 130 to display the real-life street image and the photographed data together.

The operation explained above may be executed upon receipt of the photographed data at the display apparatus 100, or alternatively, in response to a user command.

Referring to FIG. 2B, a display apparatus 100' includes the communicating unit 110, the storage unit 120, the display unit 130, the control unit 140, and a network interface unit 150.

The display apparatus 100' of FIG. 2B may receive map information and a street image from the web server, or the like, to estimate the course of travel.

The network interface unit 150 communicates with the web server that provides the map information and real-life street images. The map information may be implemented in the form of a map image, and the street image may be implemented in the form of a real-life picture.

The control unit 140 may estimate the course of travel of the user terminal 200 based on the location information included in the photographed data received from the user terminal 200.

Specifically, the control unit 140 may transmit the location information included in the photographed data to a corresponding web server via the network interface unit 150, and be provided with the estimated course of travel and a corresponding map image and real-life street image from the web server.

Alternatively, it is possible that the control unit 140 receives the map information necessary for the estimation of the course of travel from the web server via the network interface unit 150, and estimates the courses of travel accordingly.

The control unit 140 may control the network interface unit 150 to transmit the estimated course of travel or location information of the photographed data to the corresponding web server and download the corresponding map image and the real-life street images corresponding to the respective spots on the map image.

Additionally, the control unit 140 may control the display unit 120 to display the photographed data that correspond to the course of travel and the respective spots of the course of travel on the map image.

Figure 3A:
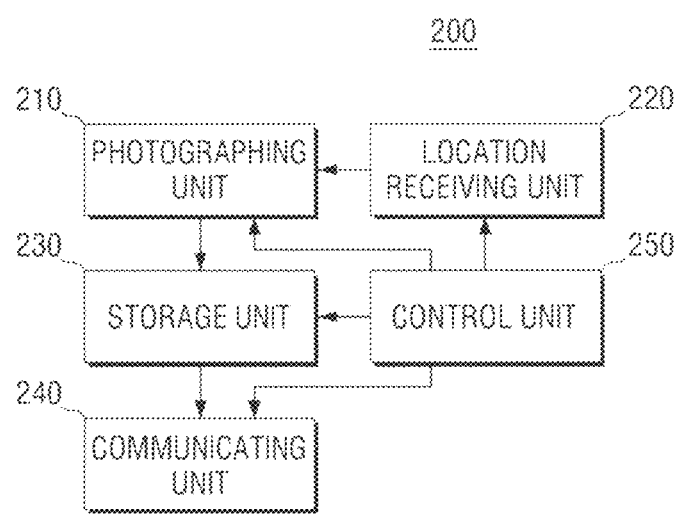
FIG. 3A is a block diagram illustrating a user terminal that provides the display service, according to an embodiment of the present invention.

FIG. 3A is a block diagram illustrating the user terminal 200 to provide the displaying services explained above, according to an embodiment of the present invention.

A photographing unit 210 operates to photograph a target under the control of a control unit 250 according to a user command inputted to an input unit. The photographing unit 210 also generates image data. The photographing unit 210 may include a lens that focuses the optical signal reflected from an object, and a Charge Coupled Device that converts the optical signal, focused through the lens, into an electrical signal.

During photographing, a location receiving unit 220 receives a GPS signal regarding the place where the photograph is taken.

The location receiving unit 220 may receive the GPS signal transmitted from the GPS satellite and generates location information. Specifically, the location receiving unit 220 may measure the time and distance for a signal from at least three GPS satellites thereto to estimate the current location thereof. The Differential GPS (DGPS) may be used to minimize the error range. The user terminal 200 may acquire not only location information including latitude, longitude, and altitude information, but also the three-dimensional velocity information and precise time information.

A storage unit 230 stores photographed data generated at the photographing unit 210. Additionally, the storage unit 230 may provide a storage space to store software such as an OS, which is necessary to operate the user terminal 200.

A communicating unit 240 operates to transmit the stored photographed data of the storage unit 230 to the displaying apparatus 100. The communicating unit 240 may be implemented as a wireless network interface, such as Wi-Fi, wipi, Bluetooth, or Ultra Wide (UW) and system, and may also be implemented as a wired network interface, such as USB, IEEE1394, or Ethernet.

The control unit 250 may provide control so that a course of travel is set based on the location information received during photographing by the photographing unit 210 and also based on a pre-defined street image received via the network including the Internet. The set course of travel is transmitted to the display apparatus 100 via the communicating unit 240.

The control unit 250 may control the location receiving unit 220 to receive a GPS signal while photographing at the photographing unit 210.

Additionally, the control unit 250 may provide control so that the location information generated at the location receiving unit 220 is geotagged to the photographed data generated at the photographing unit 210.

Additionally, the control unit 250 may estimate the course of travel based on the location information generated through the location receiving unit 220 while photographing at the photographing unit 210. Specifically, the control unit 250 may refer to the previously-generated location information to estimate the course of travel to the current state, and check the same at preset intervals to update and store the course of travel.

In the above embodiment of the present invention, the control unit 250 may arrange the previously generated location information in time order, store the arrangement, and also transmit the stored arrangement to the display apparatus 100.

Additionally, the control unit 250 may transmit the arranged data of the previously generated location information in time order to the web server, and receive from the web server a map image including the course of travel, which is estimated based on the arranged data.

Alternatively, the control unit 250 may receive from the web server (not illustrated) the corresponding map information of a place of interest, and map and store the course of travel into the map based on the previously generated location information.

Specifically, the user terminal 200 may either store the information about the course or travel in which the location information is arranged in time order, or store the information about the course of travel in which the course of travel, estimated based on the previously generated location information (implementable as a map image, for example), is mapped into the map. In the former's case, the display apparatus 100 may receive the information of the course of travel in which the location information is arranged in time order and map the received information into a map. In the latter case, the display apparatus 100' may receive the information of the course of travel, which is mapped into a map, for use.

Depending on the case, the user terminal 200 may transmit photographed data to the display apparatus 100' only if the photographed data is geotagged. It is possible that the display apparatus 100' estimates the course of travel using the location information geotagged to the photographed data.

Figure 3B:
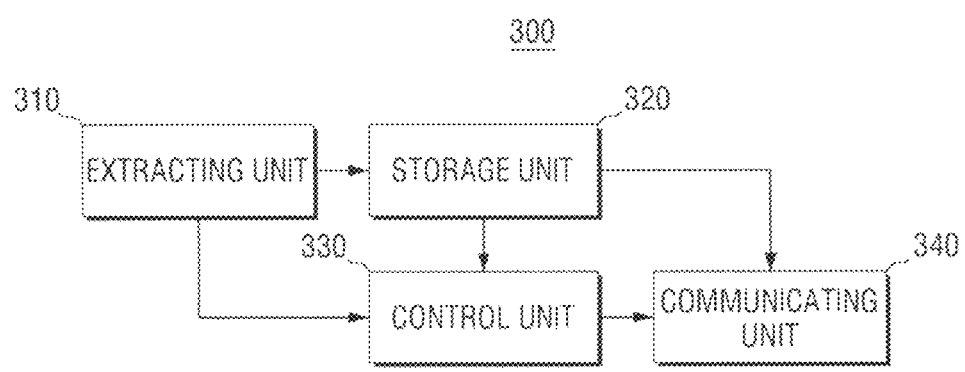
FIG. 3B is a block diagram illustrating a server that provides the display service, according to an embodiment of the present invention.

FIG. 3B is a block diagram illustrating a server that provides a display service, according to an embodiment of the present invention.

Referring to FIG. 3B, a server 300 includes an extracting unit 310, a storage unit 320, a control unit 330 and a communicating unit 340.

The extracting unit 310 extracts corresponding location information from the photographed data. The photographed data may refer to data that is received from external devices including digital cameras, mobile phones with photographing units, external storage mediums, or the like.

The storage unit 320 stores a street image and a corresponding course of travel. At least one from among the street image and the corresponding course of travel may be provided from outside, i.e., from an external data server, or the like.

The control unit 330 applies a predetermined standard to link the photographed data to a course of action with the stored street image, based on the extracted location information.

The communicating unit 340 may provide the photographed data together with the course of travel with the linked, pre-stored street image. Specifically, the communicating unit 340 may provide the user terminal having display function with corresponding data.

Additionally, the control unit 330 may estimate a possible course of travel based on the extracted location information of the photographed data, and links the photographed data to the course of travel, which provides the pre-stored street image.

The control unit 330 may also determine if there is a street image that matches the location information of the photographed data based on the extracted location information of the photographed data, from among the pre-stored street images that correspond to the course of travel between respective intersections. Accordingly, if no pre-stored street image matches the location information of the photographed data, the control unit 330 may determine a course of travel based on the location information of the photographed data.

The control unit 330 may also determine a course of travel to link the photographed data to, based on whether or not the location information of the pre-stored street image and the location information of the photographed data are within a preset distance range.

Specifically, in order to determine if the respective location information is within a preset distance range, the determined course of travel may be divided into a plurality of linear parts and it is determined if the respective location information is within a preset distance perpendicular to the respective linear parts.

If there is no photographed data that corresponds to the location information of the street image and the predetermined standard, the control unit 330 may control so that the street image can be displayed in altered state and together with the related information.

The control unit 330 may generate a map image along the linked course of travel.

The control unit 330 may generate an icon movable along the course of travel on the map image, and match real-life street image corresponding to the spot where the icon is on. The control unit 330 may provide corresponding photographed data if the icon is on a spot that corresponds to the location information of the photographed data.

Furthermore, if the icon is placed on a spot that corresponds to the location information of the photographed data and if the real-life street image is available for the spot, the control unit 330 may provide the real-life street image and the photographed data together.

The construction of the user terminal, which receives the street image, photographed data and corresponding course of travel from the server 300 of FIG. 3B is described below.

The user terminal may include a communicating unit to receive photographed data linked to a course of travel including pre-stored street images and a corresponding street image. The user terminal may also include a display unit to display the photographed data, and a control unit to control the display unit to display the corresponding photographed data together when displaying the street image along the course of travel based on the received photographed data.

The course of travel refers to a course of travel with pre-stored street images, which is linked by the server 300 based on the location information extracted from the photographed data.

It is understood by those skilled in the art that the construction of the user terminal of FIGS. 2A to 3A is implementable for the user terminal performing the functions described above.

Figure 4:
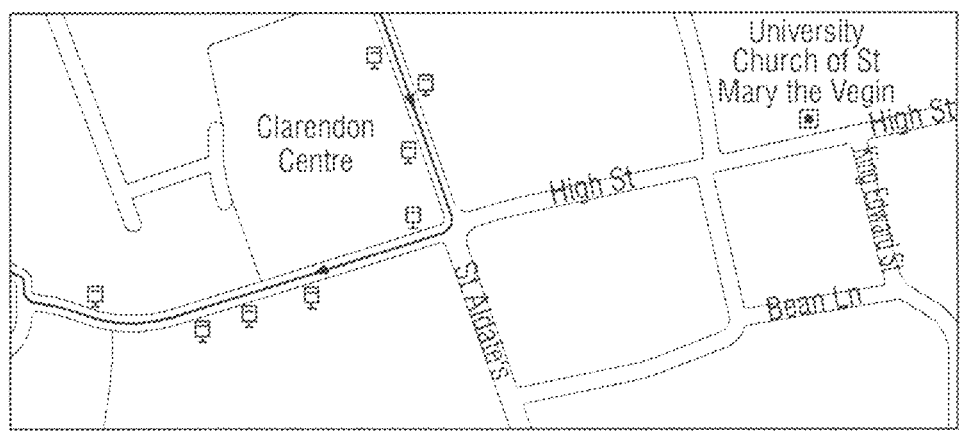
FIG. 4 is a diagram illustrating a display method, according to an embodiment of the present invention.

FIG. 4 is a diagram illustrating a display method, according to an embodiment of the present invention.

Referring to FIG. 4, it is assumed that the user travels Oxford, Great Britain.

It is also assumed that the user took photographs in the course of travel as indicated by the arrow in FIG. 4.

Figure 5A:
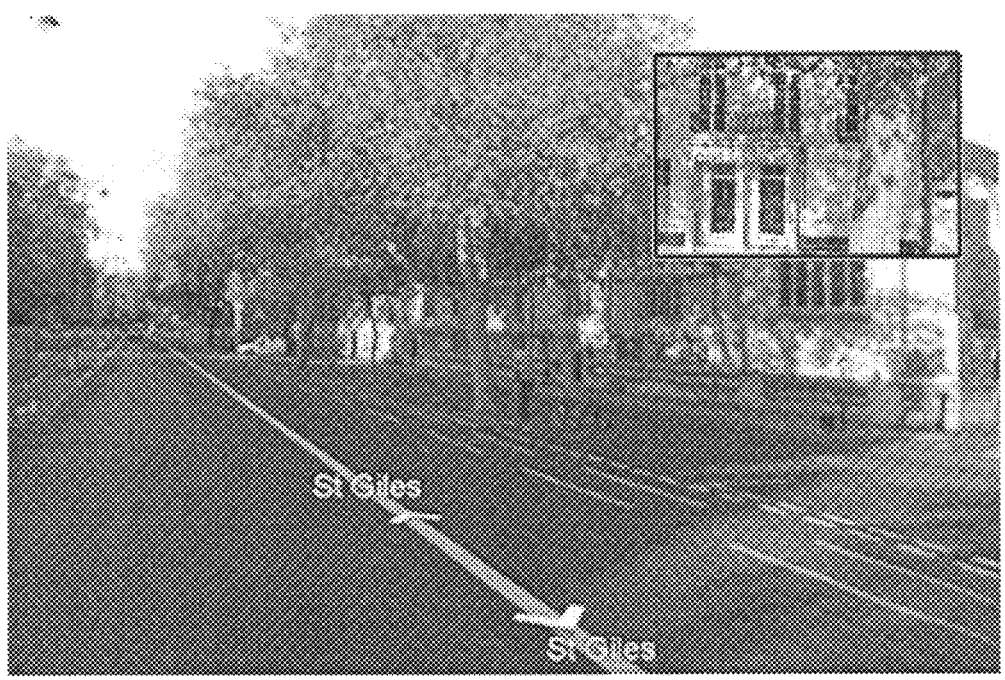
FIGS. 5A to 5C are diagrams illustrating a display method, according to an embodiment of the present invention.
Figure 5B:
Figure 5C:
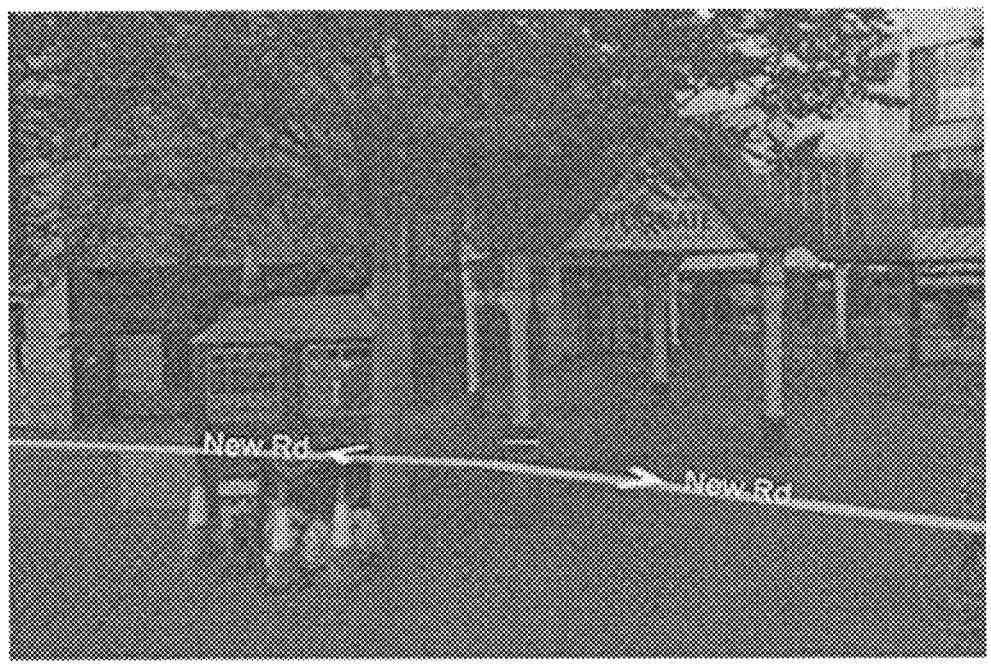

FIGS. 5A to 5C are views provided to explain a display method, according to an embodiment of the present invention.

In order to view photographs taken along the course of travel as illustrated in FIG. 4, the user connects the photographing apparatus (e.g., digital camera) to the displaying apparatus (e.g., digital TV). Upon connection, and in response to a user command, the screen, as illustrated in FIGS. 5A to 5C, appears on the digital TV.

Referring to FIGS. 5A to 5C, the street image corresponding to the course of travel (St Giles→High st→New Rd) is displayed on the screen.

Such street images may be received from the web server, which provides street images all around the world together with map information.

If there is a photograph that corresponds to the location information of the displayed street image from among the photographs received fro the user's digital camera while the street images corresponding to the user's course of travel are displayed, according to one embodiment, the corresponding photograph may be displayed as a sub-screen on the display screen as illustrated in FIGS. 5A and 5B. However, other embodiments are possible. For example, if there is a photograph that corresponds to the displayed street image, according to another embodiment, the street image may be displayed as a sub-screen, while the corresponding photograph is displayed as the main screen.

In yet another embodiment, if there is a photograph that corresponds to a specific spot on the course of travel, only the corresponding photograph may be displayed without the street image.

Meanwhile, if there is no photograph that corresponds to the location information of the displayed street image, as illustrated in FIG. 5C, only the street image may be displayed.

Although not illustrated, if there is no street image that corresponds to the user's course of travel, only the corresponding photograph may be displayed.

Figure 6A:
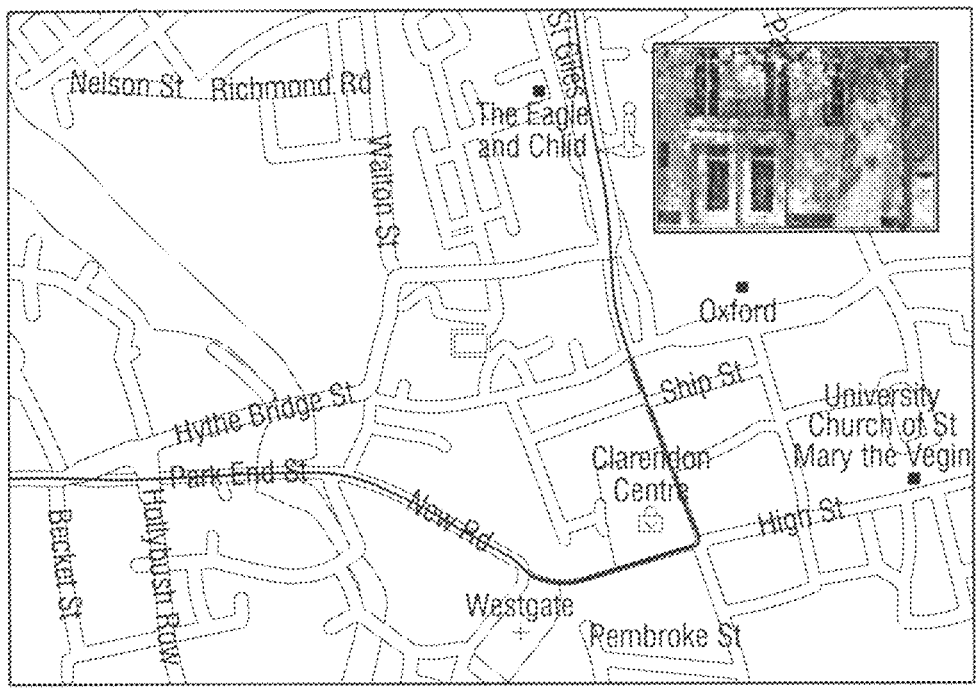
FIGS. 6A to 6C are diagrams illustrating a display method, according to an embodiment of the present invention.
Figure 6B:
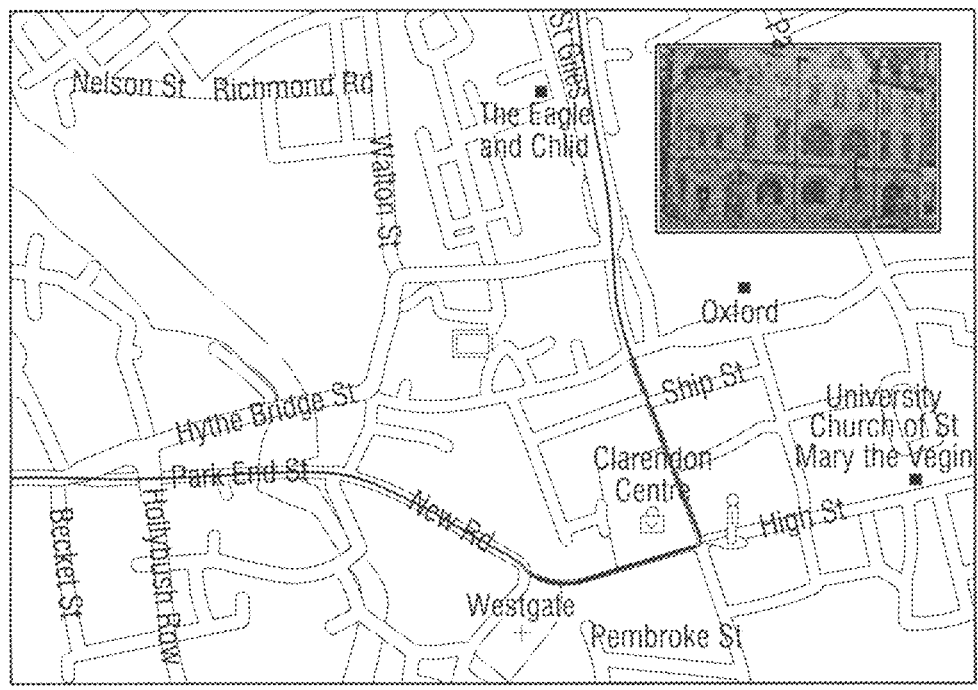
Figure 6C:
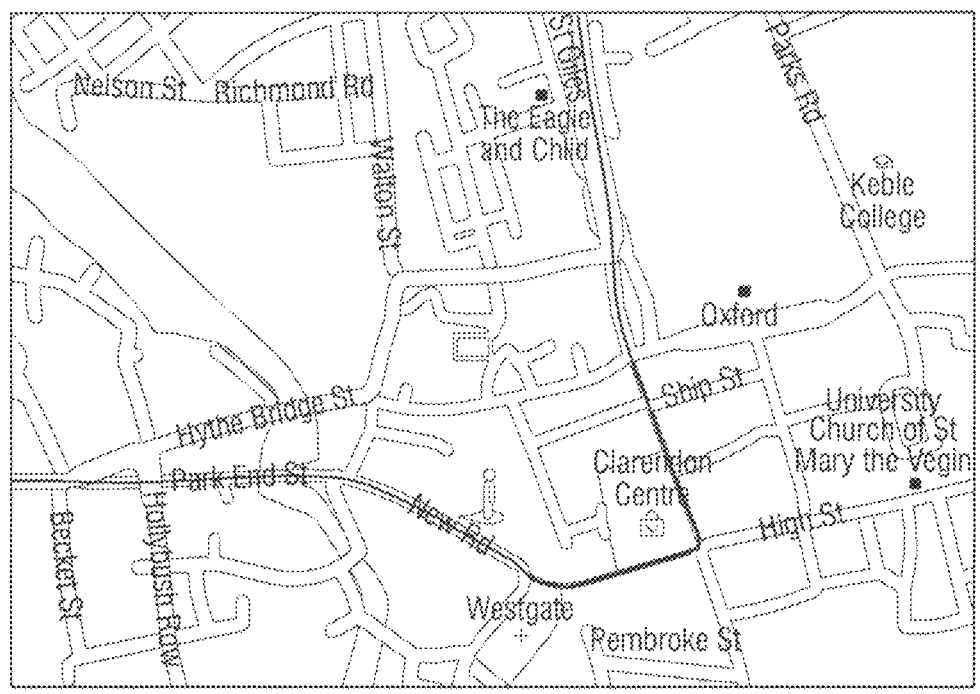

It is also possible that a corresponding map image is displayed instead of the street image as illustrated in FIGS. 6A to 6C, if there is no street image corresponding to the user's course of travel. In this example too, the map image screen may directly be transformed into a street image screen if there is the street image corresponding to certain spot on the course of travel.

FIGS. 6A to 6C are views provided to explain a display method according to an embodiment of the present invention.

The user connects the photographing apparatus (e.g, digital camera) to the displaying apparatus (e.g., digital TV) to view photographed data be taken along the course of travel as illustrated in FIG. 4. Upon connection, or in response to a user command, the screen as illustrated in FIGS. 6A to 6C appears on the digital TV screen.

Referring to FIGS. 6A to 6C, the map image corresponding to the user's actual course of travel (i.e., St Giles→High st→New Rd) is displayed.

As explained above, the map image may be received from the web server which provides the map images all around the world.

According to the user's course of travel, a user icon may appear on the map image to indicate the current spot, thereby enabling the user to recognize easily as to the spot of the course of travel the corresponding photograph was taken.

According to the user's course of travel on the map image, if there is a photograph corresponding to the location information of the user icon from among the photographs received from the user's digital camera, the corresponding photograph may be displayed as a sub-screen within the display screen as illustrated in FIGS. 6A and 6B.

If there is no photograph that corresponds to the location information of the user icon on the map image, the corresponding street image may be displayed as the sub-screen.

Meanwhile, the street image screen illustrated in FIGS. 5A to 5C and the map image screen illustrated in FIGS. 6A to 6C may be transformed in accordance with the user command.

Furthermore, as described above, the map image and the street image may replace each other as necessary.

Furthermore, depending on the manner of implementation, the street image, map image and the corresponding photograph may be displayed concurrently on one screen.

Figure 7A:
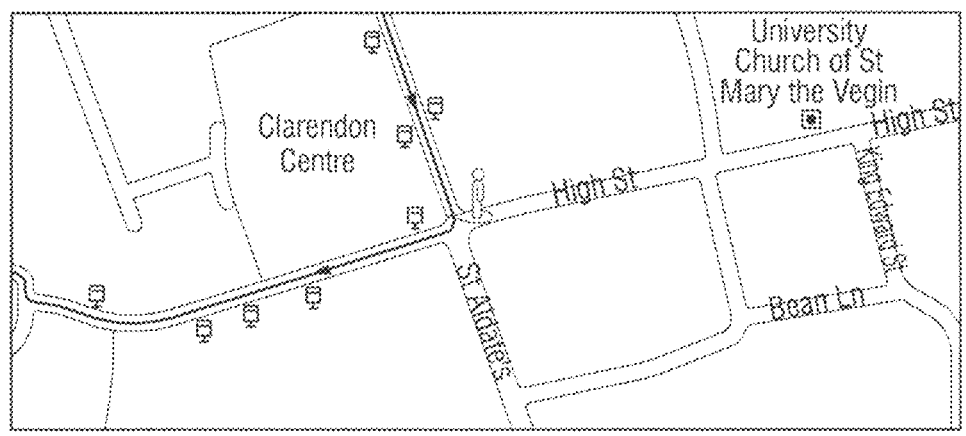
FIGS. 7A and 7B are diagrams illustrating examples of displaying the map image of FIGS. 6A to 6C, according to an embodiment of the present invention.
Figure 7B:

FIGS. 7A and 7B are views provided to explain various embodiments of displaying the map image of FIGS. 6A to 6C.

Referring to FIG. 6A, a user icon appears along the course of travel. In one embodiment, an icon may appear to indicate it if there is a photograph corresponding to the location information of the respective spots of the course of travel, for the notice of the user. Accordingly, the user knows on which spot on the course of travel the photograph is going to be displayed.

Referring to the screen of FIG. 6B, the spot on which the user icon is currently placed, i.e., the photograph currently displayed on the display screen, is marked by an icon distinguishable from the icons of the other photographs. Specifically, the icons are differentiated by size. However, this is written only for illustrative purpose, and the icons may be differentiated by a variety of ways such as shading, highlighting, or the like.

Figure 8:
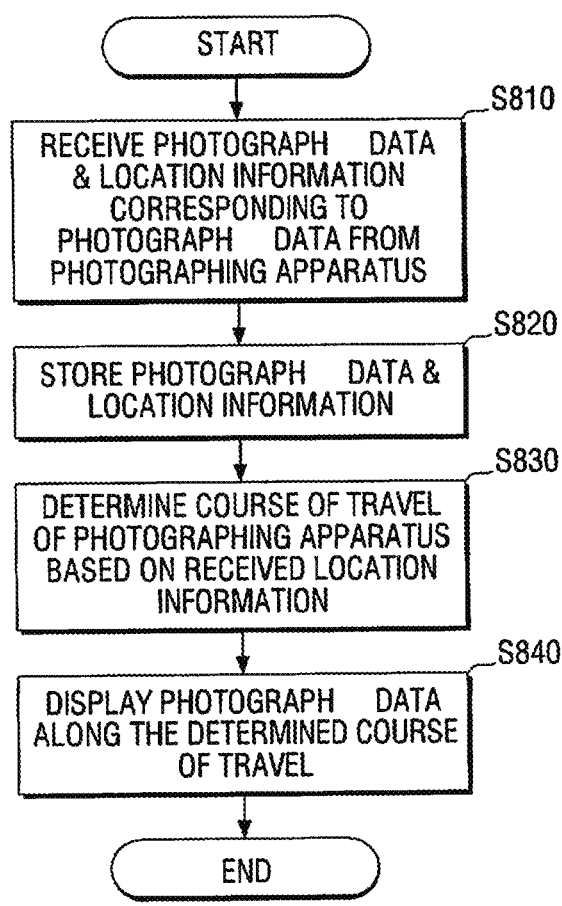
FIG. 8 is a flowchart illustrating a display method of a display apparatus, according to an embodiment of the present invention.

FIG. 8 is a flowchart illustrating a display method of a displaying apparatus, according to an embodiment of the present invention.

According to the display method of the displaying apparatus of FIG. 8, at step S810, the photographed data and location information corresponding to the photographed data are received from the photographing apparatus. The location information may be implemented as being geotagged to the corresponding photographed. At step S820, the photographed data and the location information are stored.

At step S830, a course of travel by the photographing apparatus is determined based on the received location information of the photographed data and location information of pre-stored street image.

At step S840, the real-life street image corresponding to each spot on the determined course of travel is displayed, and if the location information of the street image and the location information of the photographed data meet a predetermined standard, the corresponding photographed data is displayed together with the street image.

The determining of the course of travel in step S820 may include estimating possible courses of travel based on the received location information of the photographed data and determining one of the possible courses of travel that provides the pre-stored street image as the course of travel.

Additionally, whether or not the predetermined standard is met at in step S840 may be determined based on determination as to whether the location information of the street image and the location information of the photographed data are within a preset distance range. Specifically, the determined course of travel is divided into a plurality of linear parts and it is determined whether the respective location information exists within a preset distance perpendicular to the respective linear parts.

If there is no photographed data that meets the location information of the street image and the predetermined standard at step S840, the street image may be displayed in altered state, or displayed together with related information.

In the above-described embodiment of the present invention, the map information to estimate the course of travel, the map image corresponding to the estimated course of travel, and the real-life street image corresponding to the respective spots on the map image, may be received from a related web server.

Figure 9:
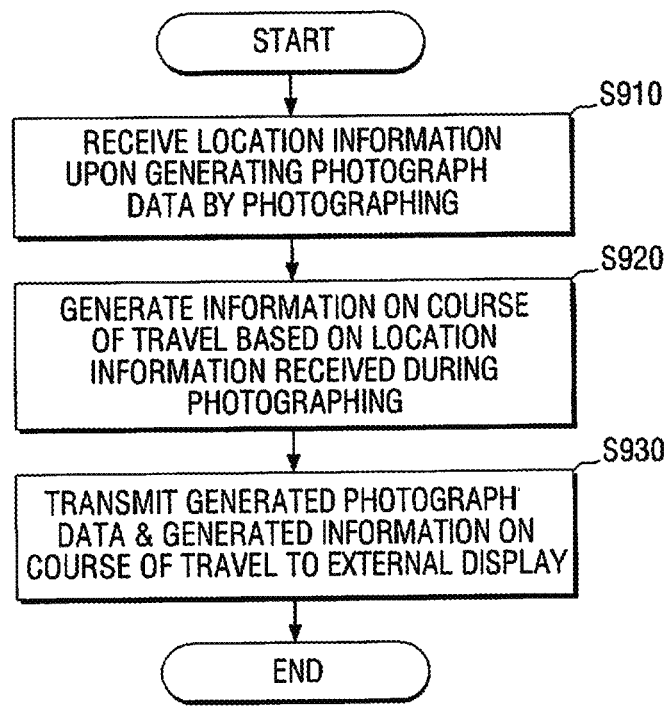
FIG. 9 is a flowchart illustrating a method for generating data of a user terminal, according to an embodiment of the present invention.

FIG. 9 is a flowchart illustrating a method for generating data of a user terminal, according to an embodiment of the present invention.

According to the method for generating data of the user terminal of FIG. 9, at step S910, location information is received upon generating of the photographed data by photographing.

At step S920, a course of travel by the user terminal is set based on the location information received during photographing at step S910 and also based on a pre-defined street image. It is possible to update and periodically store the course of travel based on the location information received at step S910 and the pre-defined street image. The street image may be received from a corresponding web server.

Alternatively, the location information received during photographing at step S910 may be transmitted to the web server and the information on the course of travel estimated at the web server based on the location information and the pre-defined street image provided by the web server may be received from the web server.

At step S930, the photographed data generated at step S920 and the information on the set course of travel are transmitted to an external display apparatus.

Figure 10:
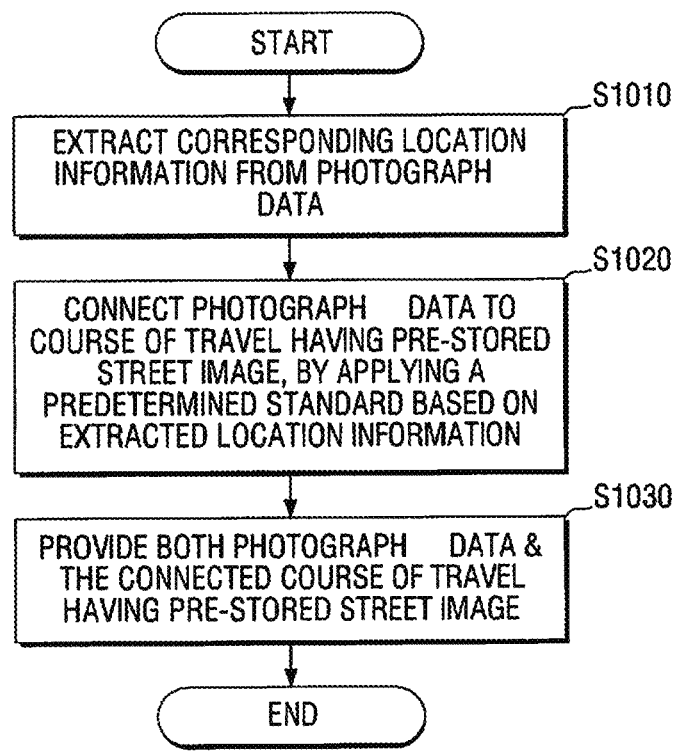
FIG. 10 is a flowchart illustrating a method for controlling a server, according to an embodiment of the present invention.

FIG. 10 is a flowchart illustrating a method for providing service, according to an embodiment of the present invention.

According to a method for providing service as illustrated in FIG. 10, at step S1010, the corresponding location information is extracted from the photographed data.

Next, at step S1020, based on a predetermined standard applied according to the extracted location information, the photographed data is linked to a course of travel, which has the pre-stored street image.

At step S1030, the photographed data, together with the linked course of travel having the pre-stored street image, is provided to the external device.

The operation at step S1020 may include estimating possible courses of travel based on the extracted location information of the photographed data, and linking one of the possible courses of travel that provides the pre-stored street image, to the photographed data.

Additionally, the operation at step S1020 may include determining, based on the extracted location information of the photographed data, if there is a street image that matches the location information of the photographed data from among the pre-stored street images corresponding to the course of travel between the respective intersections within the course of travel. If there is the pre-stored street image that corresponds to the locate information of the photographed data, a course of travel is determined based on the pre-stored street image. If not, the course of travel may be determined based on the location information of the photographed data.

Additionally, the operation at step S1020 may include determining, based on the extracted location information of the photographed data, a course of travel to which the photographed data is linked, based on a determination as to whether or not the location information of the pre-stored street image and the location information of the photographed data are within a predetermined distance range.

The determination as to whether the location information is within the predetermined distance range may be performed by dividing the determined course of travel into linear parts and determining if the respective location information is within a preset distance perpendicular to the respective linear parts.

Furthermore, the operation at step S1030 may include displaying the street image in altered state or together with related information about the street image, if there is no photographed data corresponding to the location information of the street image of the course of travel and the predetermined standard.

Furthermore, the method may additionally include generating a map image along the linked course of travel, generating an icon to be moved along the course of travel on the generated map image, matching a spot with the icon thereon with a real-life street image, and providing the photographed data if the icon is placed on a spot corresponding to the location information.

The operation of providing the photographed data may include providing the photographed data together with the real-life street image, if there is real-life street image available for the spot, which corresponds to the location information and on which the icon is placed.

Meanwhile, according to a control method of the user terminal, which receives and displays photographed data according to the control method of the server of FIG. 10, first, the course of travel and the corresponding street image are received from the server. As the street image is displayed along the course of travel based on the received photographed data, the corresponding photographed data is displayed together. The course of travel may refer to the course of travel which is linked according to a predetermined standard applied based on the location information extracted from the photographed data.

Accordingly, upon viewing the photographs, the user feels as if he/she is actually walking along the same street that he/she walked on during photographing, and thus can have more vivid memory.

The present invention can be modified into a variety of configurations, and should not be limited by the content illustrated or described herein.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A method for providing a mapping service, the method comprising:
   extracting position information from an image photographed from a photographing device;
   determining a moving path of a user based on a plurality of information including the extracted position information;
   displaying a map image including an icon moving along the determined moving path; and
   displaying the photographed image around the icon.

2. The method as claimed in claim 1, wherein displaying the photographed image comprises, when there is a street image corresponding to a point where the icon is located based on position information of a prestored street image, displaying the photographed image and the street image together.

3. The method as claimed in claim 1, wherein the map image is received from a web server which provides a web image of each region of the map image.

4. The method as claimed in claim 1, wherein displaying the map image comprises, when there is an image corresponding to position information of each of a plurality of points included in the moving path, displaying an icon of the photographed image around each point where the photographed image exists.

5. An electronic device for displaying a map image comprising:
   a communicator configured to communicate with a photographing device;
   a display configured to display the map image; and
   a controller, in response to receipt of, from the photographing device, an image photographed by photographing device, configured to extract position information from the received photographed image, determine a moving path of a user based on a plurality of information including the extracted position information, and display a map image including an icon moving along the determined moving path, wherein the controller, in response to the icon being located at a point corresponding to the position information, controls the display to display the photographed image around the icon.

6. The electronic device as claimed in claim 5, wherein the controller, when there is a street image corresponding to the point where the icon is located based on position information of a prestored street image, controls the display to display the photographed image and the street image together.

7. The electronic device as claimed in claim 5, wherein the map image is received from a web server which provides a web image of each region of the map image.

8. The electronic device as claimed in claim 5, wherein the controller, when there is an image corresponding to position information of each of a plurality of points included in the moving path, controls the display to display an icon of the photographed image around each point where the photographed image exists.

* * * * *